(12) United States Patent
Callaghan et al.

(10) Patent No.: US 7,496,924 B2
(45) Date of Patent: Feb. 24, 2009

(54) DISPATCHING MESSAGES AMONG REGISTERED SOFTWARE MODULES IN TELECOMMUNICATIONS SYSTEM INCLUDING TELEPHONY INTERNET SERVER COUPLED BETWEEN PACKET NETWORK AND PBX

(75) Inventors: Robert Callaghan, Coral Springs, FL (US); Markku Korpi, Starmberg (DE); Jeff Cripe, Lake Worth, FL (US); Mark Grosberg, Boca Raton, FL (US); Kristin Butcher, Boynton Bch., FL (US); Leroy Gilbert, Wellington, FL (US); Wyatt Howe, Boca Raton, FL (US); Kenton Cross, Boca Raton, FL (US); Geert Fieremans, Ghent (BE)

(73) Assignee: Siemens Communications, Inc., Boca Raton, FL (US)

( * ) Notice: Subject to any disclaimer, the term of this patent is extended or adjusted under 35 U.S.C. 154(b) by 278 days.

(21) Appl. No.: 09/742,696

(22) Filed: Dec. 19, 2000

(65) Prior Publication Data

US 2002/0021774 A1    Feb. 21, 2002

Related U.S. Application Data

(60) Provisional application No. 60/192,275, filed on Mar. 27, 2000.

(51) Int. Cl.
*G06F 15/16* (2006.01)
*G06F 15/173* (2006.01)
*G06F 15/177* (2006.01)

(52) U.S. Cl. ............... 719/313; 709/203; 718/105; 718/107

(58) Field of Classification Search ............. 709/314, 709/311, 312, 313, 315, 318, 200–203, 217–230; 719/310–318, 330–332; 718/100, 106, 105, 718/107, 104; 379/900, 88.25, 100; 725/106; 455/554.1; 377/66; 370/298; 375/370; 735/106
See application file for complete search history.

(56) References Cited

U.S. PATENT DOCUMENTS

| | | | | |
|---|---|---|---|---|
| 5,677,927 | A | 10/1997 | Fullerton et al. | 375/200 |
| 5,742,640 | A | 4/1998 | Haoue et al. | 375/220 |
| 5,828,677 | A | 10/1998 | Sayeed et al. | 371/41 |
| 5,878,130 | A * | 3/1999 | Andrews et al. | 379/265.09 |
| 5,946,346 | A | 8/1999 | Ahmed et al. | 375/219 |
| 6,005,893 | A | 12/1999 | Hyll | 375/260 |
| 6,088,387 | A | 7/2000 | Gelblum et al. | 375/222 |
| 6,130,882 | A | 10/2000 | Levin | 370/252 |
| 6,138,017 | A * | 10/2000 | Price et al. | 455/433 |
| 6,157,464 | A * | 12/2000 | Bloomfield et al. | 358/407 |
| 6,209,018 | B1 * | 3/2001 | Ben-Shachar et al. | 718/105 |

(Continued)

OTHER PUBLICATIONS

Coulouris et. al. Distributed Systems Concepts and Design, Second edition, 1994, pp. 34-38.*

(Continued)

*Primary Examiner*—Haresh N Patel

(57) ABSTRACT

A telecommunications system having a software dispatcher is provided for delivering messages between dispatcher clients, i.e., software subsystems that may be in the same process, a different process, or on a different machine. The dispatcher manages a pool of threads to balance the workload. The dispatcher can process both synchronous and asynchronous messages by dispatching the message to all registered subsystems in order of their registered priority.

15 Claims, 3 Drawing Sheets

U.S. PATENT DOCUMENTS

| | | | |
|---|---|---|---|
| 6,222,888 B1 | 4/2001 | Kao et al. | 375/260 |
| 6,236,674 B1 | 5/2001 | Morelli et al. | 375/219 |
| 6,307,849 B1 * | 10/2001 | Tiedemann, Jr. | 370/335 |
| 6,330,316 B1 * | 12/2001 | Donak et al. | 379/196 |
| 6,335,927 B1 * | 1/2002 | Elliott et al. | 370/352 |
| 6,349,135 B2 * | 2/2002 | Frazier et al. | 379/93.01 |
| 6,363,065 B1 * | 3/2002 | Thornton et al. | 370/352 |
| 6,389,452 B1 * | 5/2002 | Glass | 709/202 |
| 6,421,328 B1 * | 7/2002 | Larribeau et al. | 370/329 |
| 6,446,127 B1 * | 9/2002 | Schuster et al. | 709/227 |
| 6,487,290 B1 * | 11/2002 | Le Grand | 379/265.02 |
| 6,516,027 B1 | 2/2003 | Kapoor et al. | 375/227 |
| 6,556,565 B1 * | 4/2003 | Ward et al. | 370/356 |
| 6,560,329 B1 * | 5/2003 | Draginich et al. | 379/265.02 |
| 6,564,261 B1 * | 5/2003 | Gudjonsson et al. | 709/227 |
| 6,571,089 B1 | 5/2003 | Richards et al. | 455/266 |
| 6,574,605 B1 * | 6/2003 | Sanders et al. | 705/8 |
| 6,590,869 B1 * | 7/2003 | Beyda et al. | 370/248 |
| 6,594,255 B1 * | 7/2003 | Neuman | 370/352 |
| 6,665,293 B2 * | 12/2003 | Thornton et al. | 370/352 |
| 6,678,246 B1 * | 1/2004 | Smyth | 370/230 |
| 6,678,371 B1 * | 1/2004 | Flockhart et al. | 379/265.02 |
| 6,731,609 B1 * | 5/2004 | Hirni et al. | 370/260 |
| 6,757,901 B1 * | 6/2004 | McCloghrie et al. | 719/318 |
| 6,996,829 B2 * | 2/2006 | Meyer | 719/328 |
| 2003/0058277 A1 * | 3/2003 | Bowman-Amuah | 345/765 |
| 2005/0093881 A1 * | 5/2005 | Okita et al. | 345/589 |

OTHER PUBLICATIONS

R. Otnes, et al. "Adaptive Data Rate Using ARQ and Nonuniform Constellations", Vehicular Technology Conference, 2001, IEEE VTS 53rd, pp. 1211-1215.

R. Otnes, et al. "Adaptive Data Rate Using ARQ and Nonuniform Constellations", Vehicular Technology Conference, 2001, IEEE VTS 53rd, pp. 1211-1215, Dec. 2001.

* cited by examiner

DISPATCHING MESSAGES AMONG REGISTERED SOFTWARE MODULES IN TELECOMMUNICATIONS SYSTEM INCLUDING TELEPHONY INTERNET SERVER COUPLED BETWEEN PACKET NETWORK AND PBX

CROSS REFERENCE TO RELATED APPLICATIONS

This application claims priority from U.S. Provisional Application Ser. No. 60/192,275, filed Mar. 27, 2000, which is hereby incorporated by reference in its entirety as if fully set forth herein.

BACKGROUND OF THE INVENTION

1. Field of the Invention

The present invention relates to telecommunication systems and, particularly, to a system and method for linking software elements in a telecommunications system.

2. Description Of the Related Art

Telephony systems are becoming increasingly complex. The widespread use of the Internet Protocol in data communications systems has led to interest in "Voice over IP" (VoIP) and "Telephony over LAN" (ToL) applications. In particular, several IP telephony protocols have been developed, including the H.323 Recommendation suite of protocols promulgated by the International Telecommunications Union (ITU), the Session Initiation Protocol (SIP), and Media Gateway Control Protocol (MGCP), to name a few.

At the same time, there remains a large installed base of users of traditional private branch exchange (PBX) networks. While such users would benefit from low cost IP telephony, the idea of replacing such existing systems may be undesirable. An intermediate solution is the use of a Telephony Internet Server that interfaces a PBX and a packet network, and provides signaling conversion between protocols used by the PBX and by the packet network.

To be viable, such Telephony Internet Servers need to be able to dynamically add features. Moreover, it is desirable to balance system workload.

SUMMARY OF THE INVENTION

These and other problems in the prior art are overcome in large part by a system and method according to the present invention.

A telecommunications system having a software dispatcher is provided for delivering messages between dispatcher clients, i.e., software subsystems that may be in the same process, a different process, or on a different machine. The dispatcher manages a pool of threads to balance the workload. The dispatcher can process both synchronous and asynchronous messages by dispatching the message to all registered subsystems in order of their registered priority.

The dispatcher thus has the ability to dynamically add features to telephony systems. The features can run in the workspace of the original application or be in another process. The separate process can run on the same system as the original application or another system on the same network.

BRIEF DESCRIPTION OF THE DRAWINGS

A better understanding of the invention is obtained when the following detailed description is considered in conjunction with the following drawings in which.

DETAILED DESCRIPTION OF THE INVENTION

FIGS. 1-5 illustrate an improved system and method for message handling in a software system and, particularly, in a communications system. A dispatcher is provided for delivering messages between dispatcher clients, i.e., software subsystems that may be in the same process, a different process, or on a different machine. The dispatcher manages a pool of threads to balance the workload. The dispatcher can process both synchronous and asynchronous messages by dispatching the message to all registered subsystems in order of their registered priority.

Figure 1:
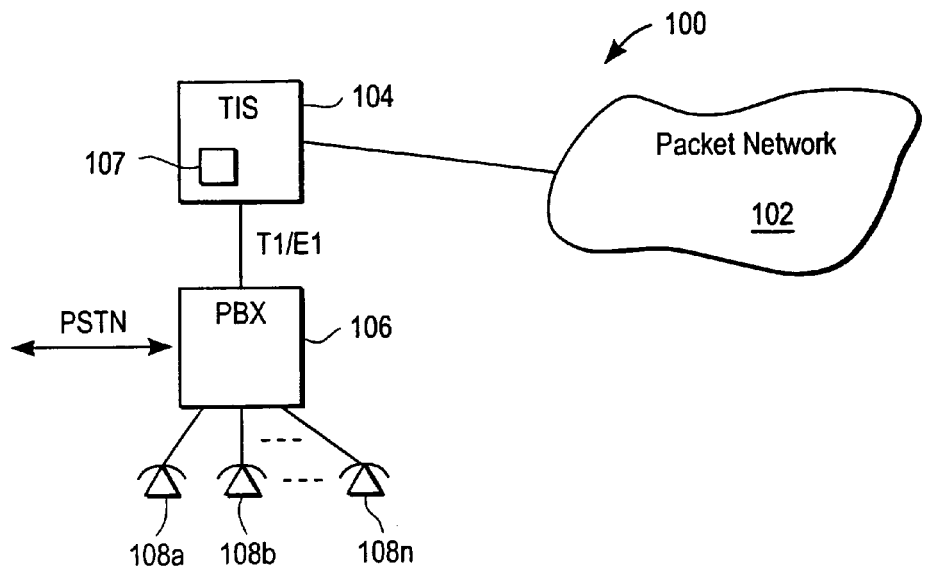
FIG. 1 is a diagram illustrating a network employing a dispatcher according to an implementation of the present invention.

Turning now to FIG. 1, a telecommunications network according to a particular implementation of the invention is illustrated therein and generally identified by the reference numeral 100. The telecommunications network 100 includes a switch, such as a private branch exchange (PBX) 106. The PBX 106 may be embodied as the Hicom 300, available from Siemens Information and Communication Networks, Inc., Boca Raton, Fla. The PBX 106 couples to the public switched telephone network (PSTN) (not shown) and a plurality of user telephony devices 108a-108n, such as telephones, facsimile machines, and the like. A packet network server or telephony Internet server 104 according to an implementation of the invention intercouples the PBX 106 to a packet network 102, such as the Internet, a corporate Intranet, or a local area network (LAN).

The packet network server 104 may be linked to the PBX 106 over a T1/E1 interface and communicate using any of a variety of protocols, such as E&M Wink Start, AT&T 4ESS SDN, CorNet-N, or CorNet NQ. The packet network server 104 communicates with the packet network using any of a variety of packet telephony protocols, such as H.323 or the Session Initiation Protocol (SIP). The packet network server 104 may be embodied as the Hicom Xpress Telephony Internet Sever (TIS) 2.0 or 2.1, implemented on a Windows NT platform, available from Siemens Information and Communication Networks, Inc., Boca Raton, Fla.

The packet network server 104 implements a controller, referred to as the dispatcher 107, for linking software modules. The dispatcher 107 handles the delivery of messages to subsystems which have registered to receive particular messages. A subsystem to which messages may be delivered can be internal or external to the application which contain the dispatcher 107. That is, subsystems of external applications may register with an application's dispatcher subsystem to receive messages. Such subsystems can include, for example, call processing subsystems and device handler subsystems. It is noted that, while described herein focusing primarily on telecommunications system software in a particular architecture, the invention is not so limited. Thus, the dispatcher 107 may be implemented as software for any complex system.

As noted above, the dispatcher 107 maintains a list of all messages in the system. The messages are identified by a unique integer and a node (MsgRcvList) in the dispatcher. Each party interested in receiving the message constructs a node (called a MessageReceiver) that is linked into the MsgRcvList. The list of message receivers is ordered via a numeric priority value. When a subsystem has a message it wants to deliver, it informs the dispatcher 107 of which message is to be delivered. The subsystem is unaware of the destination of that message. Only the dispatcher 107 knows what the destination will be. Thus, when a subsystem registers with the dispatcher 107, it is really telling the dispatcher 107 what message(s) it is interested in processing and which it is capable of sending. The dispatcher 107 has no knowledge as to the semantics of a message or the contents (attached parameters) of a message. It only knows a message as a unique integer and uses this integer to identify the list of subsystems which are to receive the message. Meaning and content of a given message is relevant only to the particular subsystems which either issue or receive the message.

Figure 2:
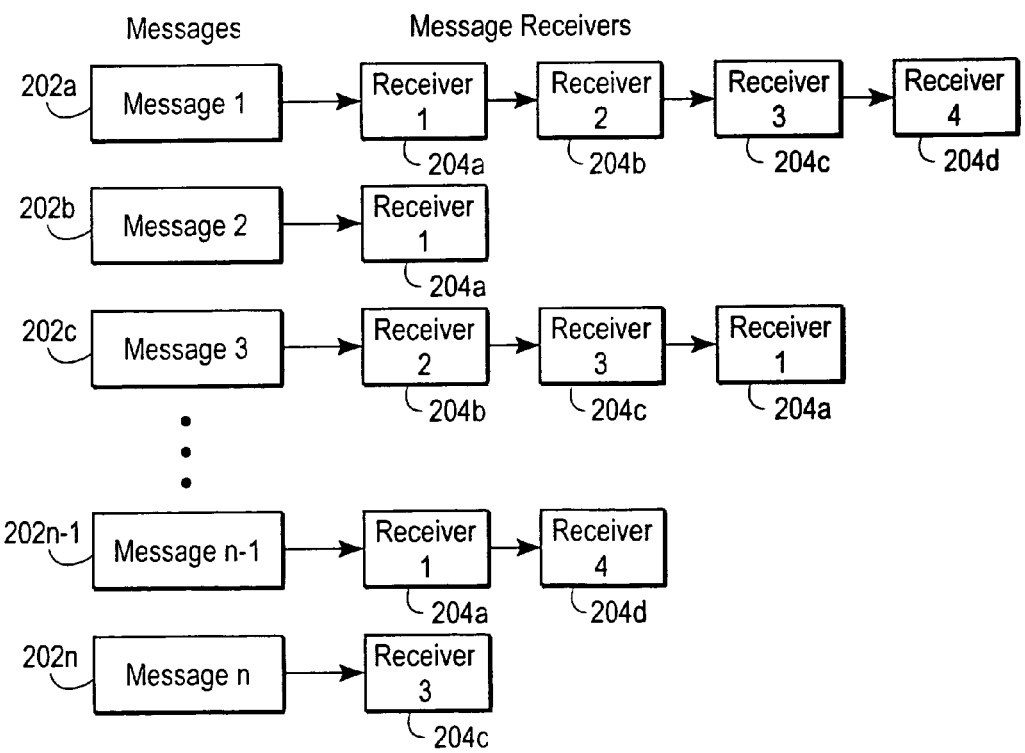
FIG. 2 is a diagram illustrating message lists according to an implementation of the invention.

As shown in FIG. 2, the dispatcher 107 maintains a list 200 of messages 202a-202n. Each message 202a-202n is associated with one or more receivers or subsystems. Thus, message 1 (202a) is associated with Receiver 1 (204a), Receiver 2 (204b), Receiver 3 (204c), and Receiver 4 (204d). Message 2 (202b) is associated with Receiver 1 (204a); Message 3 (202c) is associated with Receiver 2 (204b), Receiver 3 (204c), and Receiver 1 (204a); Message n-1 (202n-1) is associated with Receiver 1 (204a) and Receiver 4 (204d); and Message n (202n) is associated with Receiver 3 (204c).

The receivers 204a-204d are sorted in association with each message in order of priority. If two receivers have a same priority, the first to register with the dispatcher 107 will receive the message first. When the dispatcher 107 delivers a message, it serially invokes the message processing function of each message receiver on the list.

Figure 3:
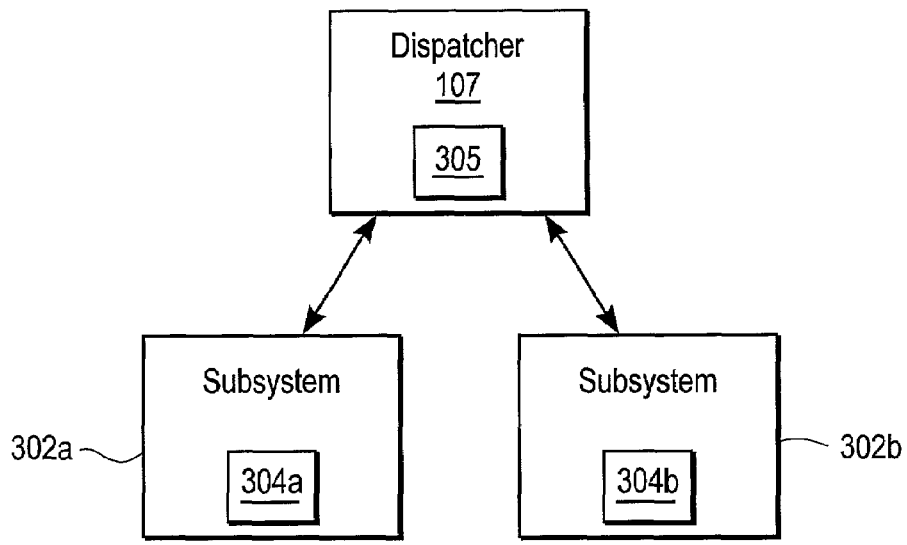
FIG. 3 is a diagram schematically illustrating message registration according to an implementation of the invention.

The registration process is illustrated schematically with reference to FIG. 3. Shown are the dispatcher 107 and a plurality of software subsystems 302a, 302b. Each software subsystem includes an interface method 304a, 304b for receiving messages from the dispatcher 107. According to one implementation of the invention, the interface 304a, 304b is callable from the dispatcher and derived from a dispatcher-provided base class.

Further, the dispatcher 107 includes an interface method 305 which is used to receive indications from the subsystems of the messages they are interested in receiving. More particularly, for each message which a subsystem wishes to receive, the subsystem invokes a method similar to the following: RegisterMessage (MessageReceiver, MessageId, MessageSubId, Priority).

MessageReceiver identifies the subsystem wishing to receive the message. This gives the dispatcher 107 the information required to be able to correctly deliver the message. MessageId identifies a single message which the subsystem wishes to receive. MessageSubId may be used as a filter to provide a finer granularity in the messages the subsystem wishes to receive. Basically, if MessageSubId is used, the subsystem would only be delivered a message identified by MessageId if the MessageSubId in the message also matched. Priority allows the message to be registered for with a specific priority with respect to other subsystems interested in the same message. For instance, a subsystem performing a background trace operation of messages would register for the messages at a lower priority than a subsystem doing some time critical processing of the message. Using this information, the dispatcher 107 can update the message receiver list (MsgRecvList) for the given message (if the list is already existing) by placing a MessageReceiver entry for the subsystem at the appropriate position in the linked list of message receivers, based on priority. If a MsgRecvList does not yet exist for the message, a new MsgRecvList is created.

While processing a dispatched message, a message receiver or subsystem will read the incoming message and its parameters, as will be explained in greater detail below. Depending on its contents, the message receiver may choose to perform actions such as dispatching a new message, adding or altering the parameters of the current message, or choose to do nothing with the message. The message receiver can tell the dispatcher 107 to continue dispatching the message or prevent any message receiver with a lower priority from seeing the message. These allow new message receivers to view dispatched messages and change the behavior of the message flow.

If an error is detected while processing the message, the reporting of the error is the responsibility of the message receiver processing the message. This distributes the error handling across all of the message receivers rather than have the sender know what can go wrong at any stage of processing the message. Errors like an invalid parameter, having a required parameter missing or having another API call fail can cause the processing message receiver to dispatch an error message to a message receiver that is part of the dispatcher subsystem and/or set the return code of the message to indicate the failure.

Figure 4:
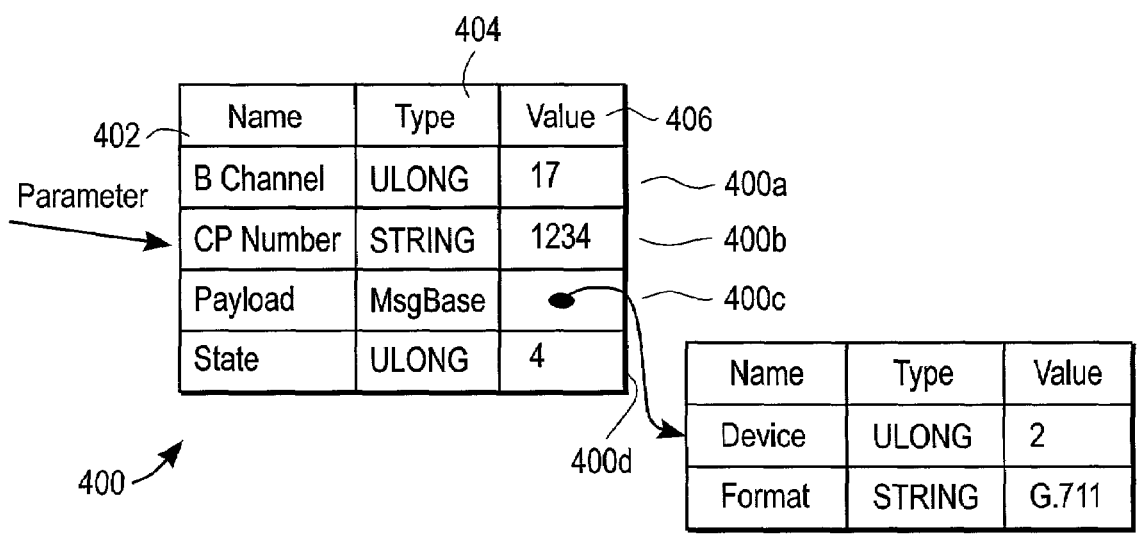
FIG. 4 is a diagram illustrating message base structure according to an implementation of the present invention.

The messages themselves are structured in Flexible Message Parameters (called MsgBase), because dynamic extensions to the dispatcher "network" may require additional parameters or information. The MsgBase is a dynamic data structure defined by a collection of 3-tuple fields: name, type, and value. The name field is an ASCII string to minimize the possibility of collision with other dynamically added fields. The type field is an enumeration that describes the format of the data in the value field. The value field contains (or points to) the actual parameter data, as shown in FIG. 4. Because the dispatcher 107 knows all types of data within the MsgBase, the transfer of a MsgBase across a network (or other medium, including persistent storage) is possible regardless of the layout and types of data in the MsgBase. Because one possible type for a field is another MsgBase, complex data structures can be managed. MsgBase objects can be dispatched locally or transported across the network transparently via a common API (application programming interface).

For example, FIG. 4 illustrates several exemplary flexible message parameters 400, each including a name 402, a type 404, and a value 406. Thus, parameter 400a has the name "B Channel", a type ULONG, and a value of 17; parameter 400b has a name of CP number, a type of STRING, and a value of 1234, and the parameter 400d has a name of state, a type ULONG, and a value 4. Further, in the example shown, the parameter 400c has a name STATE, a type ULONG, and a value of other flexible message parameters 400e or 400f.

As noted above, the dispatcher 107 can process messages in both a synchronous and an asynchronous manner. A command referred to as the sendMesssage command applies to synchronous processing, and a command referred to as the postMessage command applies to asynchronous processing.

A message that is sent via sendMessage is immediately processed serially by each subsystem registered to receive the message on the sender's thread of execution. The sendMessage call will not return to the caller until all receivers have processed the message. The sendMessage method of the dispatcher 107 allows a subsystem to issue a message an have it processed by other interested subsystems in the context of the issuing subsystem. This is similar to making an in-line procedure call to a method implemented in the target subsystem.

A message is sent via postMessage when the sender does not want or need to wait for the processing of the message to complete. The postMessage method of the dispatcher allows a subsystem to issue a message to be processed in a different context, thus allowing the issuing subsystem to complete any remaining processing in its own context prior to the issued message being processed by other subsystems.

Figure 5:
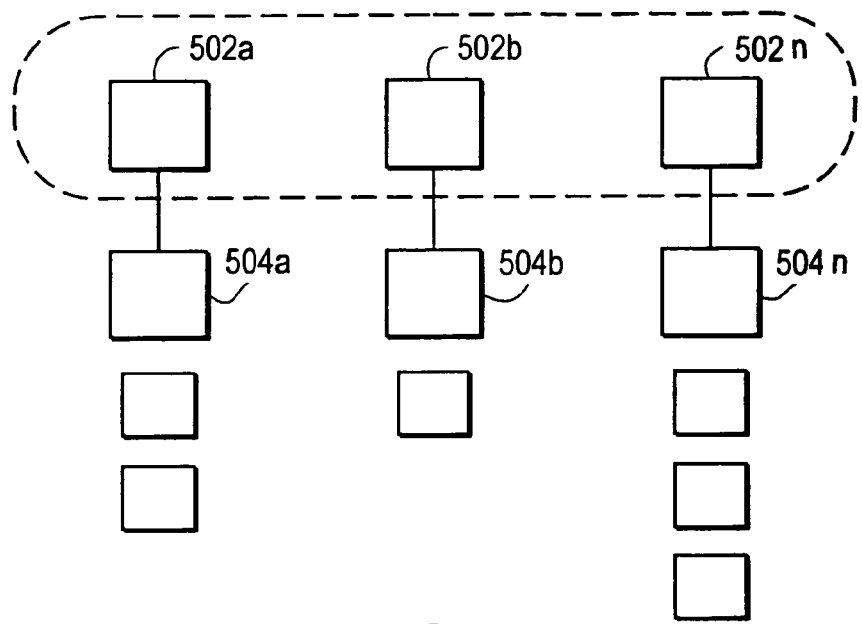
FIG. 5 is a diagram illustrating message queues according to an implementation of the invention.

In operation, as shown in FIG. 5, the dispatcher 107 manages a pool of "worker" threads 502a-502n which are used for the processing of messages. Each of these "worker" threads 502a-502n has a queue 504a-504n associated with it. With PostMessage, because posted messages are not handled immediately as with SendMessage, the messages must be "parked" somewhere until they can be handled. The messages are "parked" in the logical message queues (LMQ) 504a-504n. Each LMQ 504a-504n has a thread assigned to it as long as there are messages in it to be processed. The operating system (OS) determines when a given thread 502a-502n will become active (e.g, the one with the smallest backlog). When a thread with an LMQ 504a-504n becomes active, messages will be removed from the queue and processed as long as the thread remains active or until the LMQ 504a-504n is empty. The message is processed serially by each subsystem registered to receive the message as with a SendMessage call. The subsystem that originally posted the message may, if desired, be notified when the message processing has been completed via a subsystem supplied callback function in the message itself. If the LMQ 504a-504n is emptied, the associated thread may be returned to the free pool of threads since no more processor time is needed to process messages for the LMQ.

The number of threads actually managed by the dispatcher 107 is dynamic, based on load with some defined minimum and maximum number of threads. The dispatcher 107 can add or remove threads as the load dictates. Operating system semaphores are used to keep the dispatcher's data members thread safe while adding and deleting from the pool of threads. As messages are being dispatched, there is potential for a subsystem's code to process a message to be executed from different threads at the same time. If the subsystem's code to handle messages is non-reentrant, it may register with the dispatcher to use a semaphore when accessing the code to process messages and thus make the code thread safe.

In a telephony system, PostMessage is used to pass messages from a device handler subsystem (DH)(not shown) to a call processing subsystem (CP)(not shown). The device handler recognizes messages arriving asynchronously from external devices, such as a telephone going off hook or an ISDN layer 2 message, but is not capable of processing the message in the context of a call. It is CP's job to process the message. DH and CP each operate within one or more threads. The task of DH is usually small and well defined: detect a message, package it and pass it on. CP's task, on the other hand, may be quite complex depending on things like the number of features interested in a message.

Since DH could conceivably be flooded with messages for periods of time, it is not desirable to do CP's processing in the context of DH (which would happen if DH delivered its messages to CP via SendMessage). Therefore, DH delivers its messages to CP (and any other interested subsystems) via PostMessage. This concept is especially beneficial in a telephony system where an LMQ can be assigned for each call. Thus, the number of threads in use is based on the number of active calls (with messages to be processed) and the available processor time can be evenly (more or less) distributed across the current call load of the system.

In one implementation, the dispatcher and its clients are maintained in an object oriented system. As can be appreciated, in such a system, a large number of objects must be maintained. To help organize the system, the Dispatcher, in one implementation, provides an "object tree." It is noted that, in other implementations, the Dispatcher may be implemented without the object tree.

Figure 6:
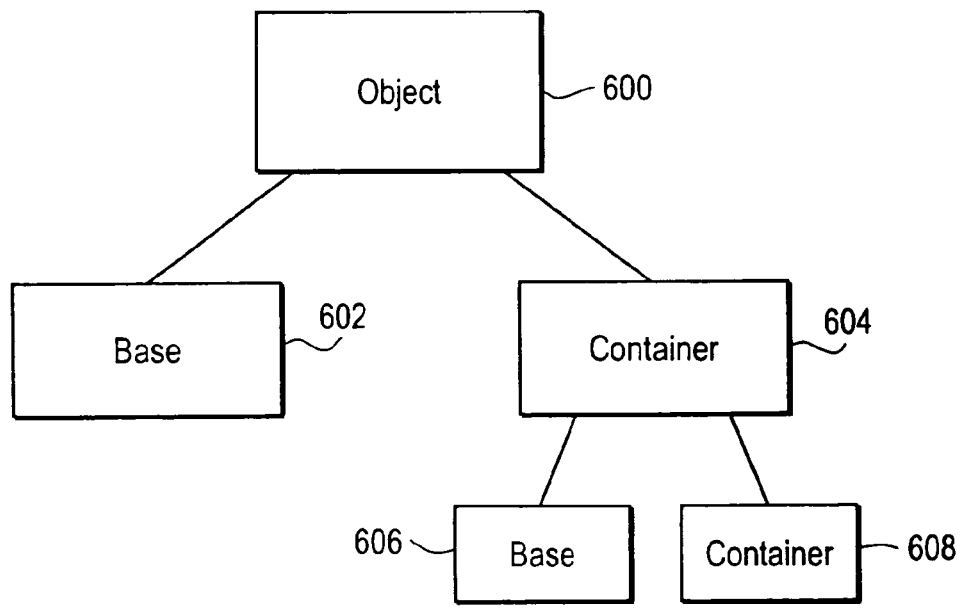
FIG. 6 depicts an object tree in accordance with the present invention.

In any event, an object tree is a hierarchical collection of named objects (similar to a UNIX file system). These objects can be inserted, referenced and deleted just as with a file system. As shown in FIG. 6, the object tree is populated by container objects 604 and base objects 602. A container object 604 can have other container or base objects 606, 608 under it. A base object is one that has a specific purpose and cannot be further subdivided.

The actual data storage methodology of a container 604 is a function of the object. To promote organization of the system the following container types are defined within the Dispatcher:

Hashed, in-memory: This container simply contains other objects and indexes them by a string. This is similar to a directory file in UNIX (although in memory, not on disk).

Array, in-memory: Some objects (such as subscribers) are best described by their sequential characteristics. The Array container accepts array subscripts instead of names (as with the Hashed, in-memory container).

In addition to data, "Object tree" objects also have actions associated with them. These actions, called "commands," are specific to the object in question. The "command" consists of an ASCII string identifying the requested function and a MsgBase containing parameters. Results are returned in another MsgBase object. This design allows objects to ask things of other objects without requiring the tight coupling of a normal API. Each object reports the available set of commands. In combination with the Dispatcher, applications can be created to administrate, control, debug and repair the software system.

The object tree is used as an API point for several system components. The database for example, attaches itself to the object name tree and appears like a container object. All objects that are placed in this container persist beyond restarts of the gateway software.

The invention described in the above detailed description is not intended to be limited to the specific form set forth herein, but is intended to cover such alternatives, modifications and equivalents as can reasonably be included within the spirit and scope of the appended claims.

What is claimed is:

1. A system comprising:
a telephony Internet server coupling a packet network to a private branch exchange, external communications from said private branch exchange passing through said telephony Internet server;
a software dispatcher in said telephony Internet server, said software dispatcher maintaining a list of all messages in said system and dynamically adding packet network software system application features to said private branch exchange;
a plurality of dispatcher clients, each identifying to said software dispatcher particular messages for receipt; and
said software dispatcher managing listed messages in a pool of threads and sending messages to said plurality of dispatcher clients synchronously and asynchronously, said software dispatcher balancing system workload between said pool of threads, wherein said software dispatcher saves asynchronous messages for later transmission in logical message queues in one or more message threads, sent said messages being sent as flexible message parameters comprising name, type, and value fields and, wherein said value field further comprises another flexible message parameter.

2. The system in accordance with claim 1, wherein messages are dispatched to identified ones of said plurality of dispatcher clients in order of dispatcher client priority.

3. The system in accordance with claim 1, wherein said software dispatcher maintains said list as a list of unique integers identifying which dispatcher clients indicated they are to receive particular messages and each of said messages is identified to said software dispatcher by a message number.

4. The system in accordance with claim 1, further comprising a private network of a plurality of coupled telephony devices connected to said packet network through said private branch exchange.

5. A method comprising:
   interfacing a packet network to a private branch exchange (PBX) in an existing private network of a plurality of coupled telephony devices, external communications to said PBX from said plurality of coupled telephony devices passing through said packet network;
   dynamically adding packet network software features to said existing private network, said packet network software features being added by a software dispatcher;
   maintaining a list of all messages in said packet network system at said software dispatcher;
   registering dispatcher clients to receive listed messages with said dispatcher, said dispatcher clients including packet network software subsystems and being identified in said list by a unique identifying integer and node; and
   dispatching messages to said dispatcher clients synchronously and asynchronously in a pool of threads, asynchronously dispatching messages comprising saving asynchronous messages for later transmission in logical message queues in one or more message threads, said software dispatcher maintaining a balanced workload between said pool of threads.

6. The method in accordance with claim 5, comprising dispatching messages in order of registered dispatcher client priority.

7. The method in accordance with claim 6, wherein the step of dispatching messages comprises dispatching messages as flexible message parameters comprising name, type, and value fields, and wherein only dispatcher clients identified to receive particular messages is aware of both content and destination of respective said particular messages.

8. The method in accordance with claim 5, wherein the step of dispatching messages selectively, dynamically adds said features to said telephony devices coupled to said private branch exchange.

9. A telecommunication system comprising:
   a private branch exchange connected a private communications network;
   a packet network server interfacing the private branch exchange to a packet network and passing external communications from said private communications network through said packet network;
   a plurality of software subsystems in said packet network; and
   a software dispatcher dynamically adding packet network software features to said private communications network, said software dispatcher in said packet network server managing a pool of message threads, said software dispatcher receiving, and synchronously and asynchronously dispatching, messages in each thread to software subsystems responsive to a unique identifying integer and node in each message, asynchronously dispatching messages comprising saving asynchronous messages for later transmission in logical message queues in one or more message threads, while said software dispatcher balances system workload between threads in said pool.

10. The telecommunications system in accordance with claim 9, wherein said one or more software subsystems provide said dispatcher with an identification of a message to be delivered and said dispatcher identifies a destination, whereby each of said one or more software subsystems is unaware of respective identified destinations.

11. The telecommunications system in accordance with claim 9, wherein said dispatcher maintains a list of registered receivers and message numbers, each distributed message being identified to said dispatcher by one of said message numbers.

12. The telecommunications system in accordance with claim 9, wherein said one or more software subsystems register with said dispatcher for receiving particular messages.

13. The telecommunications system in accordance with claim 9, wherein said software dispatcher dynamically adds said features to telephony devices coupled to said private branch exchange.

14. A system comprising:
   a software dispatcher dynamically adding software system features to dispatcher clients, maintaining a list of all messages in the system and managing a pool of message threads the system including one or more processing entities;
   a plurality of the dispatcher clients including one or more software applications, each dispatcher client identifying to said software dispatcher particular messages for receipt, ones of said dispatcher clients identifying to said software dispatcher messages for sending; and
   said software dispatcher selectively sending messages synchronously and asynchronously from said pool of message threads to dispatcher clients identified for receipt, said software dispatcher balancing system workload among said pool of message threads, wherein said software dispatcher saves asynchronous messages for later transmission in logical message queues in one or more message threads, sent said messages being sent as flexible message parameters comprising name, type, and value fields and, wherein said value field further comprises another flexible message parameter.

15. The system in accordance with claim 14, further comprising said private branch exchange (PBX) in a private network of a plurality of coupled telephony devices and said software dispatcher dynamically adds said features to telephony devices coupled to said private branch exchange.

* * * * *